(12) United States Patent
Andersson et al.

(10) Patent No.: US 6,978,546 B2
(45) Date of Patent: Dec. 27, 2005

(54) METHOD FOR PRODUCING RING MEMBERS INVOLVING USE OF A ROTATABLY DRIVEN MANDREL

(75) Inventors: Göran Andersson, Göteborg (SE); Lars Werner, Rölunda (SE); Elido Schena, Marina di Massa (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 10/428,077

(22) Filed: May 2, 2003

(65) Prior Publication Data

US 2003/0229987 A1   Dec. 18, 2003

(30) Foreign Application Priority Data

May 2, 2002   (SE) .................................... 0201319

(51) Int. Cl.[7] ........................................... B21D 53/10
(52) U.S. Cl. .......................... 29/898.066; 29/898.06; 72/364
(58) Field of Search .................. 29/898.066, 898.06; 72/69, 364, 377, 366.2, 201, 202, 225, 243.6

(56) References Cited

U.S. PATENT DOCUMENTS

| | | | |
|---|---|---|---|
| 3,867,751 A | * | 2/1975 | Connell et al. ............... 419/28 |
| 4,666,665 A | * | 5/1987 | Hornsby et al. .............. 419/48 |
| 4,676,844 A | * | 6/1987 | Satoh et al. ................. 148/504 |
| 5,038,471 A | * | 8/1991 | Peilloud et al. .......... 29/898.06 |
| 5,094,698 A | * | 3/1992 | Gallagher, Jr. .............. 148/648 |
| 5,261,159 A | * | 11/1993 | Yasuda et al. ......... 29/898.066 |
| 5,454,888 A | * | 10/1995 | Gallagher, Jr. .............. 148/648 |
| 5,538,566 A | * | 7/1996 | Gallagher, Jr. .............. 148/584 |
| 5,704,998 A | * | 1/1998 | Gallagher, Jr. .............. 148/648 |
| 5,882,123 A | * | 3/1999 | Lee et al. .................... 384/569 |
| 5,890,388 A | * | 4/1999 | Gerenser et al. ............... 72/177 |
| 6,065,322 A | * | 5/2000 | Tabata et al. .................. 72/334 |
| 6,547,422 B2 | * | 4/2003 | Tiao et al. ................... 362/298 |
| 2002/0104213 A1 | * | 8/2002 | Schneider et al. .......... 29/889.7 |
| 2004/0000053 A1 | * | 1/2004 | Bracht et al. ............ 29/898.06 |

* cited by examiner

*Primary Examiner*—Marc Jimenez
(74) *Attorney, Agent, or Firm*—Burns Doane Swecker & Mathis LLP

(57) ABSTRACT

A method for producing ring members, such as rings for rolling bearings, through use of a rolling operation involves warming a ring blank, positioning the warmed ring blank over a mandrel which is rotatable about a first axis, and positioning a forming roll rotatable about a second axis aligned with the first axis so as to form a rolling gap with the mandrel, with a portion of the ring blank being positioned in the rolling gap. The forming roll is driven to rotate in one rotary direction while the mandrel is driven to rotate in a rotary direction opposed to the rotary direction of the forming roll. During rotation of the forming roll and the mandrel, the mandrel is urged towards the forming roll to reduce the size of the rolling gap and thereby reduce the thickness of the ring blank while also increasing its diameter.

8 Claims, 3 Drawing Sheets

METHOD FOR PRODUCING RING MEMBERS INVOLVING USE OF A ROTATABLY DRIVEN MANDREL

FIELD OF THE INVENTION

This application is based on and claims priority under 35 U.S.C. §119 with respect to Swedish Application No. 0201319-1 filed on May 2, 2002, the entire content of which is incorporated herein by reference.

FIELD OF THE INVENTION

The present invention generally relates to ring members, such as race rings for rolling bearings. More particularly, the present invention pertains to a method and device for producing race rings for rolling bearings.

BACKGROUND OF THE INVENTION

The production of ring members, such as race rings for rolling bearings, especially larger rings, is often effected by forging an annular blank, and then subjecting the blank to cold rolling, followed by other machining operations, such as grinding, honing and the like. During the cold rolling operation, the annular blank, made from a bearing steel of common grade, is rolled and compressed between a mandrel and a forming roll at ambient temperature and in such a manner that the material thickness is reduced. The rolling operation does not result in the removal of any material from the blank and so the diametrical size of the ring increases and, due to the shape of the forming roll, the axial width of the ring is kept substantially unchanged. When using cold rolling, the increase in ring diameter, or the rollability of the material, is often limited to a maximum of about 2 times. In addition, the power consumption is relatively high for driving the forming roll and the receiving roll, which are driven by separate motors. The mandrel is free-wheeling.

Ring production can also be accomplished by hot rolling, with a corresponding machine design and operation, whereby the blank is heated to a material temperature of above 1200° C., at which the rolling operation is performed. The rollability associated with hot rolling is better as compared to the results with cold rolling, but a drawback with this hot rolling method is that the rings produced have a tendency for distortion and warping, and it is necessary to subject the rings for a heat treatment after the rolling operation.

A need thus exists for a method for producing ring members, through use of a rolling operation, in which the rollability is clearly improved in comparison with the cold rolling method, and which also does not suffer drawbacks to the same extent as hot rolling.

SUMMARY OF THE INVENTION

According to one aspect, a method for producing rings for rolling bearings involves warming a ring blank to obtain a warm ring blank, positioning the warm ring blank over a mandrel so that a portion of the warmed ring blank is disposed in a rolling gap defined between the mandrel and a forming roll which is rotatable about a second axis, driving the forming roll to rotate in one rotary direction and driving the mandrel to rotate in a rotary direction opposed to the one rotary direction, and reducing the rolling gap during rotation of the forming roll and the mandrel by applying a force to the mandrel to reduce a thickness of the ring blank and increase a diameter of the ring blank.

In accordance with another aspect, a method for producing ring members involves warming a ring blank to obtain a warm ring blank, positioning the warm ring blank over a mandrel which is rotatable about a first axis, and positioning a forming roll, which is rotatable about a second axis aligned with the first axis, so as to form a rolling gap with the mandrel in which is positioned a portion of the ring blank. The method also includes driving the forming roll to rotate in one rotary direction, driving the mandrel to rotate in a rotary direction opposed to the one rotary direction of the forming roll, and urging the mandrel towards the forming roll to reduce the size of the rolling gap during rotation of the forming roll and the mandrel for reducing a thickness of the ring blank while simultaneously increasing a diameter of the ring blank.

Another aspect involves a device for producing a ring member from a ring blank. The device includes a driven forming roll rotatably supported about a first axis, a mandrel rotatably supported about a second axis, and a receiving roll rotatably supported about a third axis. The first, second and third axes are mutually aligned and positioned in spaced apart relation to one another, with a rolling gap being defined between the forming roll and the mandrel, and into which a part of the ring blank is to be introduced. The mandrel is movable under influence from the receiving roll for being moved towards the forming roll to thereby reduce the size of the rolling gap, and a motor is operatively connected to the mandrel to drive the mandrel. The receiving roll contacts the mandrel and is adapted to be rotated by virtue of being in contact against the mandrel as the mandrel is driven by the motor. In addition, a warming station is positioned to warm the ring blank before the ring blank is introduced into the rolling gap.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION

Figure 1:
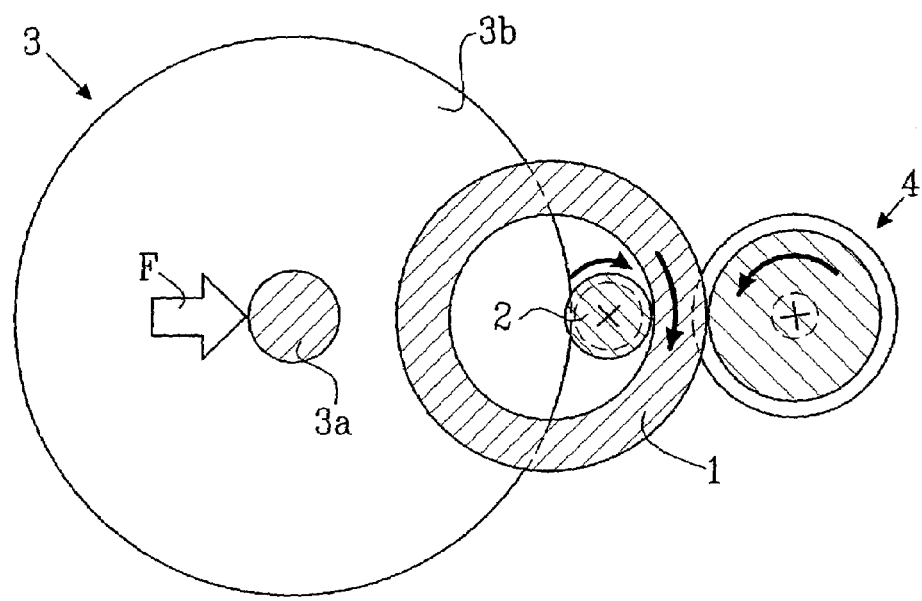
FIG. 1 is a diagrammatic side view in cross-section illustrating the principle for the rolling operation according to the present invention, and schematically illustrating components of the device for performing the rolling operation.
Figure 2:
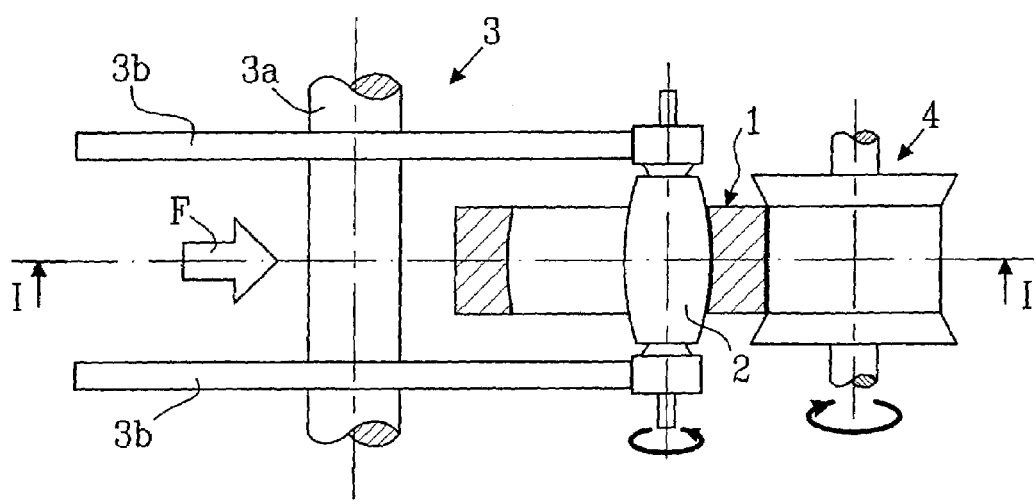
FIG. 2 is a view of the device illustrated in FIG. 1 as seen from a direction perpendicular to the view of FIG. 1 illustrating components of the device during a rolling operation, with the section line I—I showing the view of FIG. 1.

FIG. 1 is an illustration along the section line I—I in FIG. 2 schematically showing in side view and cross-section a ring rolling operation. The device or machine is shown in FIG. 1 during rolling of a ring-formed blank 1, resting on a mandrel 2 incorporated in the device. The mandrel 2 in turn contacts a receiving roll 3, while the ring blank 1 is urged against the mandrel 2 by a forming roll 4, which in an ordinary manner can have a profiled contact surface. Also the mandrel 2 can have a profiled contact surface for imparting to the ring a profiled inner surface during the rolling operation. The mandrel 2 is rotatable about a first axis, the forming roll 4 is rotatable about a second axis and the receiving roll 3 is rotatable about a third axis, with the first, second and third axes being aligned with and parallel to one another as depicted in FIG. 1.

The forming roll 4 is driven to rotate in a direction as shown by the arrow. Also, the mandrel 2 is rotated in the manner shown by the arrow and in a rotational direction opposed to that of the forming roll 4. The ring blank 1 is caused to rotate slowly in the direction shown during the rolling operation by influence from the driven mandrel 2 and from the driven forming roll 4.

In the device according to the illustrated embodiment, the receiving roll 3 is non-driven, but is urged by a force in a direction shown by the arrow F substantially radially towards the mandrel 2 for causing this to apply a contact pressure on the ring blank 1 which is positioned between the mandrel 2 and the forming roll 4. By virtue of the contact between the mandrel 2 and the receiving roll 3, the receiving roll 3 is also caused to rotate, in the clock-wise direction in the illustrated embodiment.

FIG. 2 illustrates components of the device and the rolling operation performed by the device, and also shows how the surface of the forming roll 4 is substantially cylindrical with tapering end portions. The mandrel 2 has a crowned envelope or outer surface for giving the ring blank a substantially cylindrical outer surface and a spherical inner surface. As shown, the receiving roll 3 is constituted by a shaft 3a and two axially spaced apart wheels 3b. The wheels 3b are rotatably supported on the shaft 3a and straddle the mandrel 2 as well as the ring blank 1 arranged on the mandrel 2. The wheels 3b also contact shaft journals projecting axially from the mandrel 2 so that the pushing force F can be transferred from the receiving roll 3 and so that the rotation of the driven mandrel 2 is imposed upon the receiving roll, via its wheels 3b.

Figure 3:
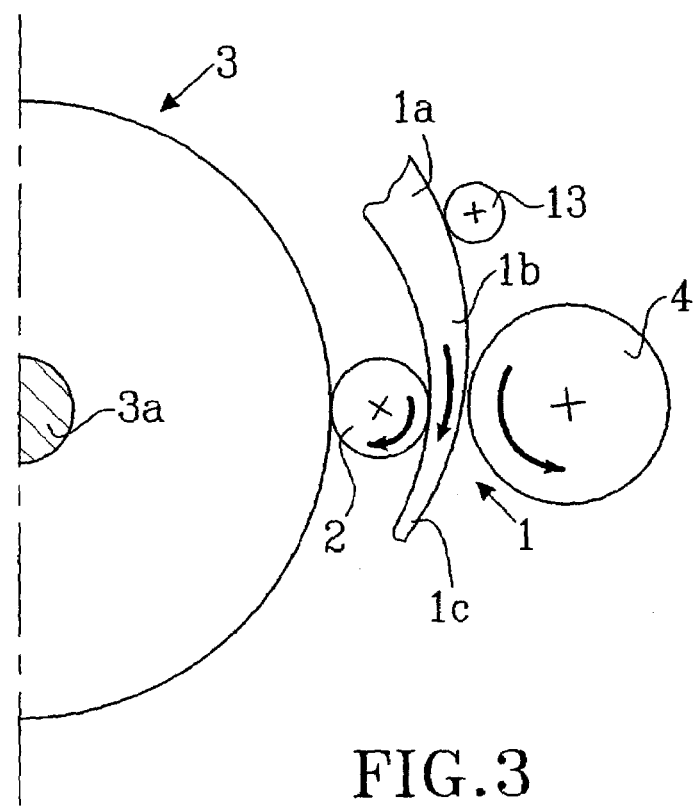
FIG. 3 is a partial end view illustrating the behavior of the ring blank during the rolling operation.

FIG. 3 shows in a fragmentary side view the operating principle for the device, with the illustration showing only a segment of the ring blank 1 just before it enters the rolling gap between the forming roll 4 and the mandrel 2, during the passage therebetween and just after it has left the rolling gap. FIG. 3 illustrates in an exaggerated manner how the ring blank 1 obtains a gradually reduced thickness as it moves toward and through the gap, such as illustrated at 1a, 1b and 1c. As the rolling operation does not remove any material from the blank, the diametrical size of the ring increases, and due to the shape of the forming roll, with the inclined end portions, the axial width of the ring will be kept substantially constant. A roundness controlling roller 13 is provided to contact the outer surface of the ring blank 2 shortly before the rolling gap.

Figure 4:
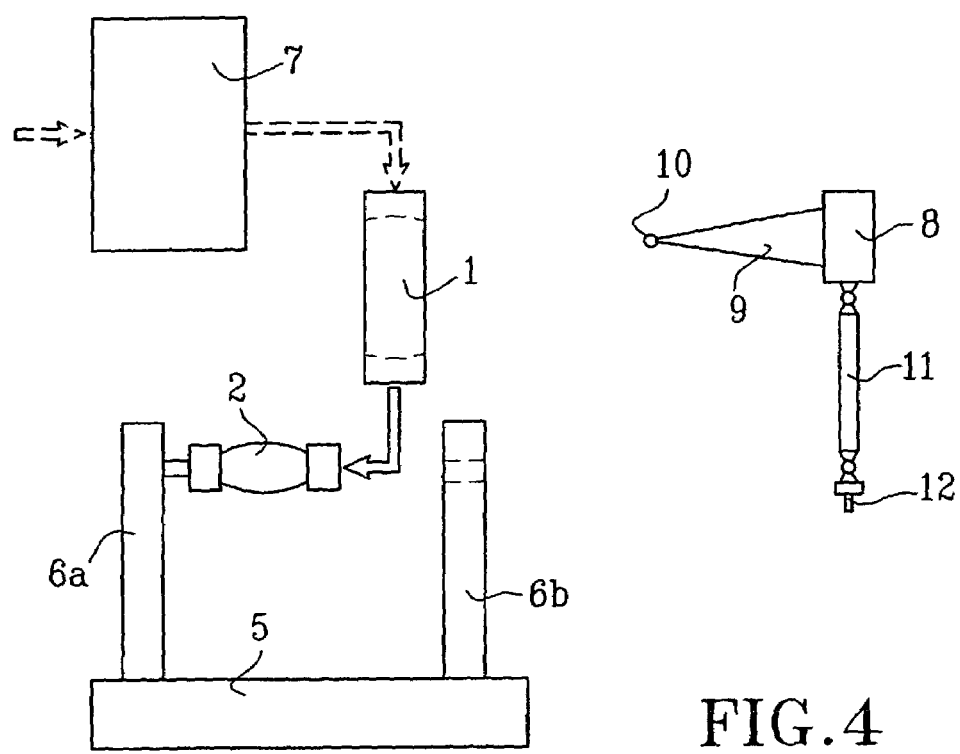
FIGS. 4–6 are schematic illustrations of consecutive steps in the supply of a ring blank from a magazine to a rolling position, with the rolls of the device not depicted for purposes of simplifying the illustration.

FIG. 4 diagrammatically shows portions of the device according to the illustrated and described embodiment, including a base frame 5 supporting two uprights 6a, 6b, each of which is arranged to support one shaft journal of the mandrel 2. One of these uprights 6b is displaceable in a linear direction towards and away from the other upright 6a for permitting loading of blanks 1 into the device so that the blank 1 can be arranged over the mandrel 2. The ring blank 1 is delivered from a magazine and passes a temperature increasing station 7, which for instance can be an induction oven or another type of appropriate heating device for heating or warming the blank to a temperature in a range which causes the blank to have a temperature of about 725° C., when it is inserted over the mandrel. The ring blank is thus warmed or heated to a temperature substantially lower than the 1200° C. temperature that is used in hot rolling operations.

A motor 8, intended for rotatably driving the mandrel 2, is arranged to be displaced to and from a driving position. The motor is positionable in the non-driving position (i.e., the motor is displaced from the driving position) to permit loading of a warmed ring blank 1 into the operating position on the mandrel 2. Although this can be accomplished in different ways, a preferred and expedient solution is illustrated and described here. The motor 8 is pivotably suspended via connecting rods 9 from a pivot point 10. A hingedly supported drive shaft 11 is connected to the output axle of the motor 8. At its opposite end, this drive shaft 11 is provided with a coupling 12, of any known type, which can be relatively easily connected to the free end of the mandrel 2 for transferring rotational motion to the mandrel 2. In FIG. 4 the motor 8 is shown in its swung away position where it does not interfere with the loading of the warmed ring blank 1.

Figure 5:
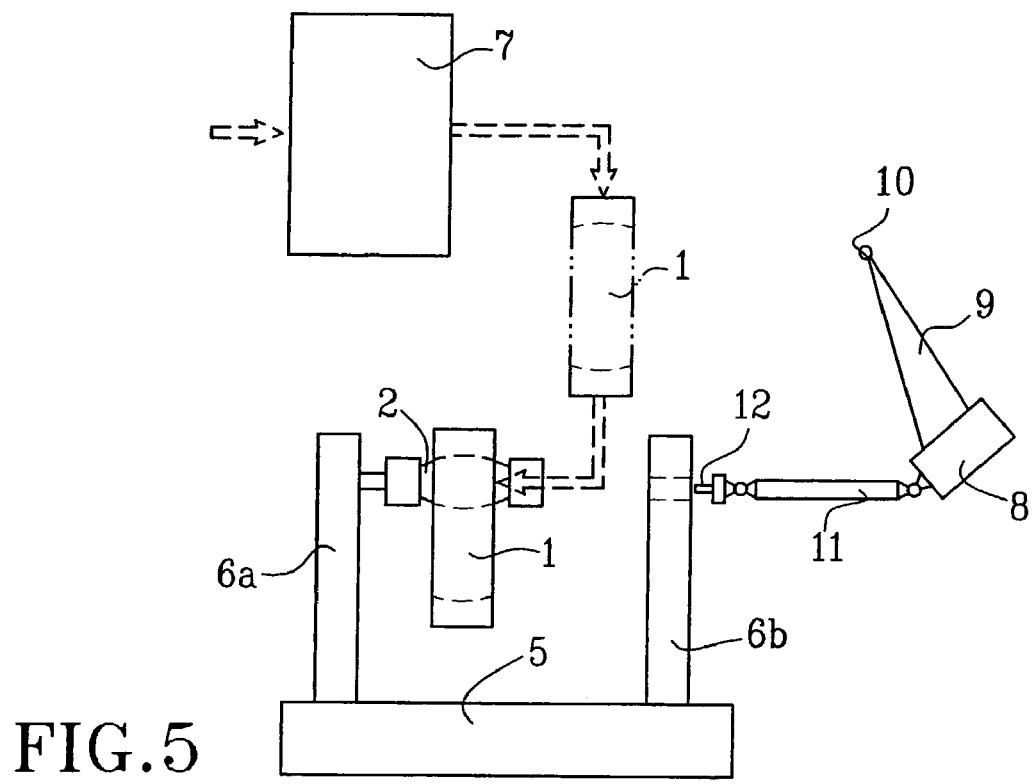

FIG. 5 illustrates that the warmed ring blank 1 has been pushed up on the mandrel 2 and that the motor 8 has begun swinging about the pivot point 10 towards it driving position. The hinged drive shaft 11 has been led or moved with its coupling 12 to the displaceable upright 6b, where it is engaged with this upright 6b. From this point, as the motor 8 continues its swinging motion in the same direction, the displaceable upright 6b is urged to move towards the first upright 6a, which is preferably fixedly attached to the base 5.

Figure 6:
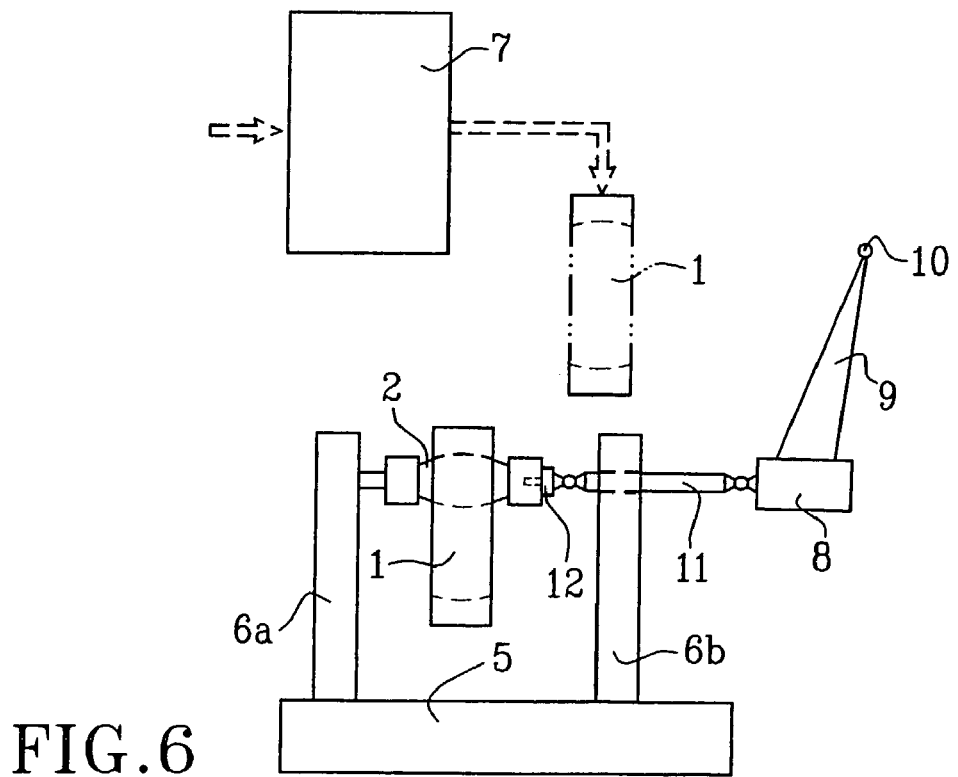

FIG. 6 illustrates that the drive shaft 11 and its coupling 12 have reached the side of the mandrel 2 opposed to the first upright 6a, whereby the coupling 12 has coupled the mandrel 2 to the drive shaft 11 so that the mandrel 2 is rotated when the motor 8 operates.

In the illustrations in FIGS. 4–6, the receiving roll and the forming roll have not been illustrated for the sake of clarity. However, it is to be understood that the rolling machine illustrated as to the feeding function and mandrel driving function in these figures incorporates such components in the manner generally illustrated in FIGS. 1–3.

One method for producing ring members such as race rings for rolling bearings is now described. Ring blanks 1, which can be severed from tube material or forged, are transferred, one by one or in batches, from a magazine or the like to a heating station 7. At the heating station, the individual blanks are warmed to a temperature of about 725° C. The warmed ring blank 1 is then pushed up on the mandrel 2, which at this moment is rotatably supported only by the first upright 6a.

When the warm ring blank 1 has been positioned on the mandrel 2, the drive shaft 11 connected to the drive motor 8 is coupled to the cantilevered end of the mandrel 2, thereby being in a position to rotatably drive the mandrel 2. The forming roll 4 is positioned to lay against or contact the outer envelope surface of the ring blank 1 so that the forming roll 4 has a substantially axially extending line contact against the ring blank at a position just opposite to that where the mandrel 2 has a line contact with the inner envelope surface of the ring blank. The forming roll 4 is rotated in a direction opposite to the rotational direction of the mandrel 2, thereby pressing the material of the warm ring blank between the forming roll and the mandrel. The receiving roll 3 at the same time is pressed against the shaft journals of the mandrel 2, whereby the mandrel 2 is urged against the portion of the ring blank momentarily positioned in the roll gap between the mandrel 2 and the forming roll 4.

The receiving roll 3 is not directly driven but is freely rotatably supported and is therefore rotated following its contact with the shaft journals of the rotatably driven mandrel 2. As the forming roll 4 and the mandrel 2 are rotated in opposed directions, with the mandrel 2 being urged towards the forming roll 4 by influence of the receiving roll 3, the thickness of the ring blank 1 is reduced. Due to the shape of the forming roll 4, the axial width of the ring substantially cannot be increased, and because no material is removed during the process, the reduction in section as indicated by the consecutively reduced sections 1a, 1b, 1c in FIG. 3, will result in an increase in ring diameter.

The resulting rollability, for a common bearing steel, when using the method and machine described above, has proven itself to be up to and even in excess of about 3.0, i.e., a yield which is about 50% higher than obtained when using common cold rolling techniques with otherwise comparable parameters. Compared to the cold rolling technique, the method and device described above also results in a 50% decrease in rolling power, as a result of the better flowability of the material in the warm ring blank, and also due to the fact that the forming roll 4 and the mandrel 2 are rotatably driven in the new warm rolling process whereas the cold rolling process has used driven forming and receiving rolls, with the mandrel being rotated by way of the contact between receiving roll and the ring blank.

The resulting ring will have virtually no, or at least very low, tendencies of distortion after the rolling operation because the blank temperature of about 725° C. will not give rise to the same internal stresses and warping risks as rings subjected to about 1200° C. as in the case of hot rolling. Taken together, these factors contribute to making it possible to reach production efficiencies superior to those obtained with cold rolling techniques and the ring members produced with the described warm rolling method.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A method for producing rings for rolling bearings comprising:
    warming a ring blank to obtain a warm ring blank;
    positioning the warm ring blank over a mandrel which is rotatably driven about a first axis so that a portion of the warmed ring blank is disposed in a rolling gap defined between the mandrel and a forming roll which is rotatable about a second axis;
    driving the forming roll to rotate in one rotary direction and driving the mandrel to rotate in a rotary direction opposed to the one rotary direction through operation of a motor connected to the mandrel; and
    reducing the rolling gap during rotation of the forming roll and the mandrel by applying a force to the mandrel to reduce a thickness of the ring blank and increase a diameter of the ring blank.

2. The method according to claim 1, wherein the ring blank is warmed to a temperature of about 725° C.

3. The method according to claim 2, wherein the mandrel is urged towards the forming roll by a receiving roll which is rotatably arranged about a third axis substantially aligned with the first and second axes, the receiving roll being rotated by virtue of contact with the rotatably driven mandrel.

4. The method according to claim 1, wherein the mandrel is urged towards the forming roll by a receiving roll which is rotatably arranged about a third axis substantially aligned with the first and second axes, the receiving roll being rotated by virtue of contact with the rotatably driven mandrel.

5. A method for producing ring members comprising:
    warming a ring blank to obtain a warm ring blank;
    positioning the warm ring blank over a mandrel which is rotatable about a first axis;
    positioning a forming roll, which is rotatable about a second axis aligned with the first axis, so as to form a rolling gap with the mandrel in which is positioned a portion of the ring blank;
    driving the forming roll to rotate in one rotary direction;
    driving the mandrel to rotate in a rotary direction opposed to the one rotary direction of the forming roll through operation of a motor connected to the mandrel; and
    urging the mandrel towards the forming roll to reduce the size of the rolling gap during rotation of the forming roll and the mandrel for reducing a thickness of the ring blank while simultaneously increasing a diameter of the ring blank.

6. The method according to claim 5, wherein the ring blank is warmed to a temperature of about 725° C.

7. The method according to claim 5, wherein the force is applied to the mandrel in a direction towards the forming roll by a receiving roll which is rotatably arranged about a third axis substantially aligned with the first and second axes.

8. The method according to claim 7, wherein the receiving roll contacts the mandrel so that the receiving roll is rotated by virtue of the contact with the rotatably driven mandrel.

* * * * *